May 13, 1924.
L. E. BOYER
ANTISLIPPING DEVICE FOR VEHICLE WHEELS
Filed April 17, 1922
1,493,461
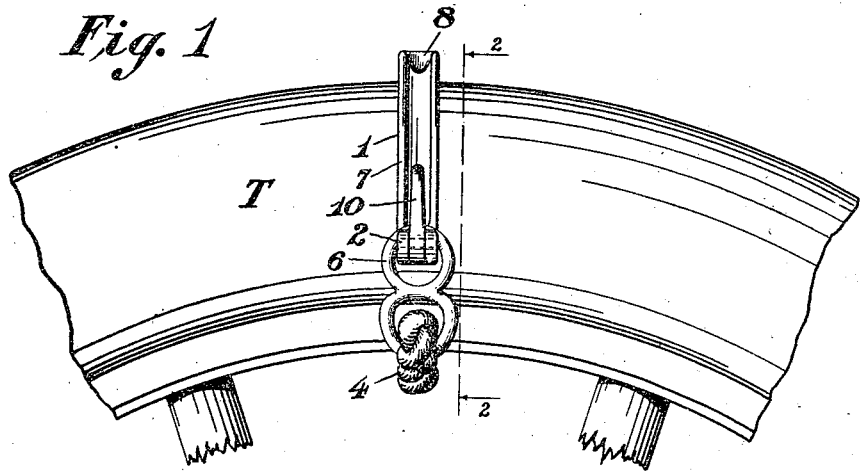
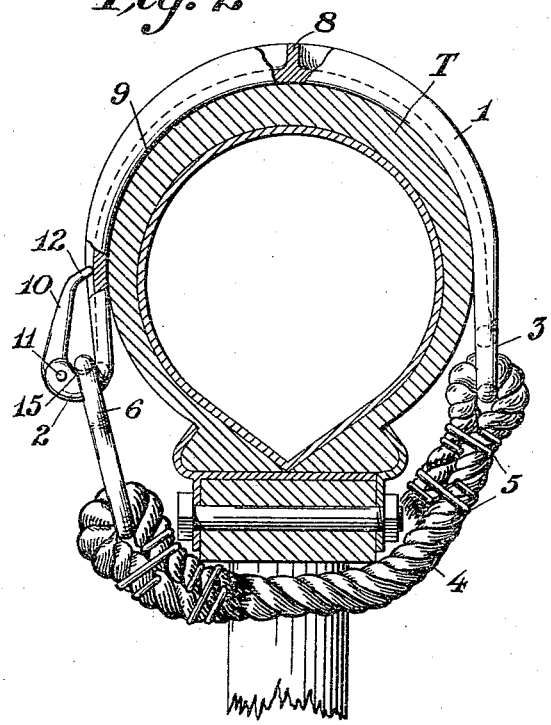
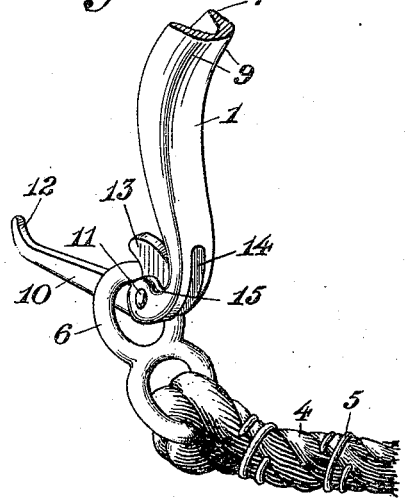
Inventor
L. E. Boyer
Witness:—
Wm. E. Seaver.
By Robb & Robb & Hill
Attorneys Patented May 13, 1924.

1,493,461

UNITED STATES PATENT OFFICE.

LEWIS E. BOYER, OF PORT CLINTON, OHIO.

ANTISLIPPING DEVICE FOR VEHICLE WHEELS.

Application filed April 17, 1922. Serial No. 553,785.

*To all whom it may concern:*

Be it known that I, LEWIS E. BOYER, a citizen of the United States, residing at Port Clinton, in the county of Ottawa and State of Ohio, have invented certain new and useful Improvements in Antislipping Devices for Vehicle Wheels, of which the following is a specification.

This invention relates to certain new and useful improvements in anti-slipping devices for vehicle wheels.

The object of the invention is to provide a grip-tread for the wheels of automobiles or other similar vehicles which may be readily and easily attached thereto either singly or in plural numbers.

One of the important features of my invention resides in the provision of a fastening means arranged and constructed to co-act with the tread member to form a seat for the retaining means holding the tread member in place, said fastening means being operable to effect displacement of the retaining means when it is desired to remove the device.

A further feature is embodied in the arrangement of this fastening means such that the stresses on the retaining means tend to hold it in locked position and against likelihood of accidental displacement.

With the above and other objects in view, the invention consists in certain combinations and arrangements of the parts as will more fully appear as the description proceeds, the novel features thereof being pointed out in the appended claims.

In the accompanying drawings forming a part of the specification and in which similar reference characters designate like parts throughout the several views;

Figure 1 is a side elevation of a portion of an automobile wheel, showing a device constructed in accordance with this invention applied thereto;

Figure 2 is a transverse sectional view taken on the line 2—2 of Figure 1; and

Figure 3 is a perspective view showing the fastening means in half closed position.

Referring more particularly to the drawings, the reference numeral 1 indicates a U-shaped non-resilient member of such curvature as to fit snugly the tread of an automobile tire, the arms of this member being approximately parallel to permit of its emplacement and removal. One arm of this tire-engaging member has a hooked end 2, while the other is formed into an eye 3, engaged by a flexible element, such as a rope 4, said element being secured therein by any suitable means, such as wire ties 5, and being of sufficient length to pass in operative position about the felly of the wheel. The opposite end of this flexible element 4 carries an eye, ring or link 6 which is adapted to pass over the hooked end 2 of the tread-engaging member 1, thus fastening the device to the wheel.

The tread-engaging member 1 is U-shaped in its transverse section, the side flanges 7 tapering gradually from their central portions to their opposite ends, as indicated in Figure 2. Connecting the central portions of these flanges and formed integrally therewith is a strengthening web 8, the upper edge of which extends flush with the edges of the side flanges. So as not to cut or injure the rubber tire the inner surface of this U-shaped member is rounding where it contacts with the tire, as indicated at 9.

The fastening device comprises in part the handle or lever 10 pivoted as by the transverse pin 11 in the hooked end 2 of the U-shaped member 1. The outer end 12 of this lever is bent as indicated, so as to extend inwardly into the groove or channel formed between the flanges 7 of the tread-engaging member 1, thus preventing any road obstructions from forcing open said fastening lever. The inner end of the lever 10 forms a hook 13 working in a slot 14 and of such shape and curvature as, when in closed or locked position, to conform with the contour of the hooked end 2 of the U-shaped member 1. This hooked end 2, it will be observed, is curved upwardly forming therebehind a pocket or seat 15 for the reception of the link or ring 6. The concave surface of the fastening hook 13 forms a seat for the reception of the end of the connecting element 6 and this seat, it will be observed from Figure 2, lies slightly above the seat 15 formed in the hooked end 2 of the tread-engaging member. By referring to Figure 2 it will be plainly seen that the ring 6 is, therefore, locked in three ways against accidental disengagement; because the inwardly bent end 12 of the fastening lever will ward off any road obstructions tending to force open said lever; because the connecting element 4 through the ring 6 exerts a downward pull on the hook 13, thus throwing and holding the end 12 of the fastening lever tightly in the groove or channel of the tread-engaging member; and because of the upwardly curved hooked end 2 of the said tread-engaging member.

To attach the device, the U-shaped member 1 is pressed downwardly over the tire T, the ring 6 brought forwardly over the felly of the wheel, slipped over the end 12 of the fastening lever 10 which is then quickly and forcibly thrown upward to its closed position. In detaching the device the lever 10 is brought forward by the use of a screwdriver blade, pen knife, or other suitable handy means, thus displacing the ring 6 from its seat and allowing the easy removal of the entire device from the wheel.

It is to be understood that I do not wish to be limited to the number of grip-treads, as obviously, as many as desired or may be convenient may be employed.

As various changes in form, proportions, and in the minor details of the construction may be resorted to without departing from the spirit of the invention, I do not wish to be limited to the construction herein shown and described, other than that set forth in the appended claims.

I claim:

1. A non-slipping device for vehicle wheels comprising a tread member having a seat at one side, a connecting member therefor connected at one end to one side of the tread member and adapted to pass about the felly of the wheel to engage the seat at the other side of the tread member, and fastening means on said seat having a member disposed to be engaged by the end of the connecting member when in locking position and to positively displace said connecting member when the fastener is opened.

2. A non-slipping device for vehicle wheels comprising a tread member having at one side a seat, a connecting member therefor connected at one end to one side of the tread member and adapted to pass about the felly of the wheel to engage in the seat aforesaid, and fastening means on the tread member at the seat portion and provided with a co-acting seat engaged by the end of the connecting member, said fastening means being adapted to lock said connecting member on said tread member through tension upon the connecting member.

3. A non-slipping device for vehicle wheels comprising a tread member having at one side a seat, a connecting member therefor connected at one end to one side of the tread member and adapted to pass about the felly of the wheel, to engage in the seat on the other side of the tread member, said connecting member being held by pressure against said seat, and pivoted fastening means cooperating with said seat and engaged by the connecting member to lock said connecting member on said tread member.

4. A non-slipping device for vehicle wheels comprising a tread member having a seat at one side, a connecting member for retaining said tread member upon the vehicle wheel, and a pivoted lever at the seat of the tread member and having a co-operating seat extension to receive an end of the connecting member and held in closed position thereby.

5. A non-slipping device for vehicle wheels comprising a tread member, a connecting member, and fastening means comprising a pivoted lever having a seat extension at one side of the pivot to receive the end of the connecting member and a lever extension on the other side of said pivot constituting closing means for retaining the said connecting member in connected position, the lever extension being operable to displace the connecting means through said seat extension.

6. A non-slipping device for vehicle wheels comprising a tread member having at one side a seat, a connecting member, and means for fastening said connecting member to said tread member comprising a pivoted lever having a seat extension and providing a seat portion co-acting with said tread seat portion to receive the end of the connecting member, the seat portion of said fastening member being slightly raised with respect to the seat of said tread member, whereby the stress applied through the connecting member will hold the fastening member in closed position.

7. A non-slipping device for vehicle wheels comprising a tread member of U-shaped transverse section, a connecting member, and means for fastening said connecting member to said tread member comprising a pivoted lever forming to one side of the pivot a seat extension to receive the end of said connecting member, and forming to the other side of said pivot a lever extension the outer end of which is bent inwardly to lie in locked position between the flanges of said tread member, said fastening means being held in locked position by the stress exerted through said connecting member.

In testimony whereof I affix my signature.

LEWIS E. BOYER.